United States Patent [19]

Motoi et al.

[11] Patent Number: 4,996,540
[45] Date of Patent: Feb. 26, 1991

[54] RECORDER WITH LIGAMENT SUPPORTED SCAN MIRROR AND RESILIENT OPTICAL SYSTEM SUPPORT

[75] Inventors: Toshihiro Motoi; Toshihiko Nakazawa; Toshihiro Takesue; Satoshi Takahashi; Takashi Murahashi, all of Hachioji, Japan

[73] Assignee: Konica Corporation, Tokyo, Japan

[21] Appl. No.: 301,242

[22] Filed: Jan. 24, 1989

[30] Foreign Application Priority Data

Jan. 29, 1988 [JP] Japan .................................. 63-20225
Mar. 31, 1988 [JP] Japan .................................. 63-79907

[51] Int. Cl.$^5$ ........................ H04N 1/21; G02B 26/08
[52] U.S. Cl. ...................................... 346/108; 350/6.6
[58] Field of Search .................... 346/108, 107 R, 160; 350/6.5, 6.6, 6.8

[56] References Cited

U.S. PATENT DOCUMENTS 4,684,228  8/1987  Holthusen ........................... 346/108

FOREIGN PATENT DOCUMENTS 63-14117  1/1988  Japan .

Primary Examiner—Mark J. Reinhart
Attorney, Agent, or Firm—Frishauf, Holtz, Goodman & Woodward

[57] ABSTRACT

An image recording apparatus having a beam scanning optical system using a deflector having a deflecting member, wherein a resilient member is interposed between the optical system including said deflector and an image forming portion. The resilient member is made of a viscous resilient elastomer of low hardness.

4 Claims, 7 Drawing Sheets

| SHAPE | SIZE ⌀D (mm) | H (mm) |
|---|---|---|
| A | 28.5 | 12.5 |
| B | 20.0 | 21.0 |
| E | 15.0 | 7.0 |
| F | 15.0 | 10.0 |

UNIT mm

F I G. 6
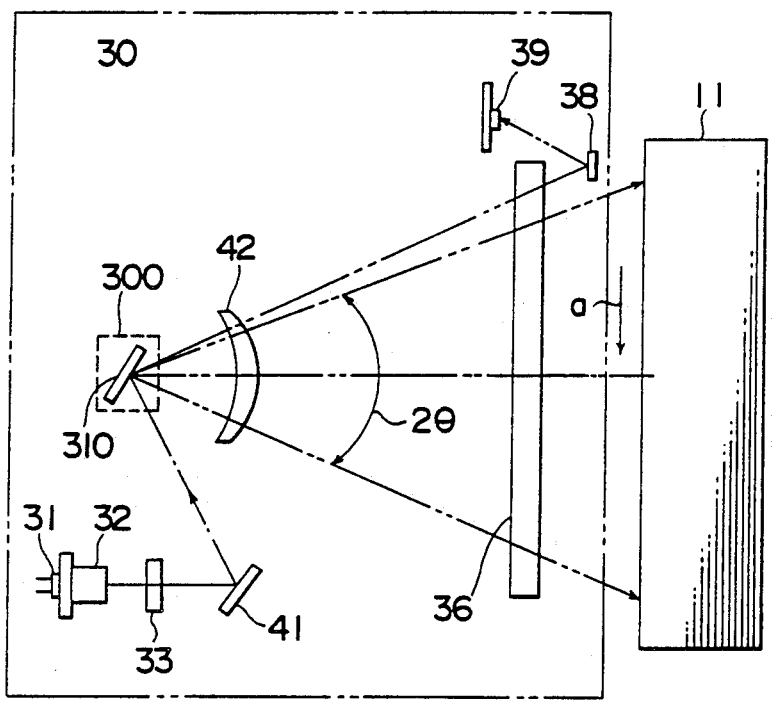
F I G. 7
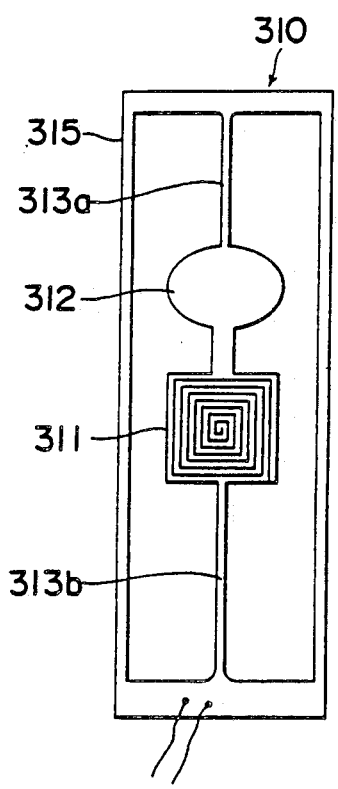

RECORDER WITH LIGAMENT SUPPORTED SCAN MIRROR AND RESILIENT OPTICAL SYSTEM SUPPORT

BACKGROUND OF THE INVENTION

1. Field of the Invention

The present invention relates to an image recording apparatus using a laser beam and suited for an electrophotographic color copying machine and a laser printer.

2. Description of the Prior Art

We have proposed a laser recording apparatus using a deflector, as disclosed in Japanese Patent Laid-Open No. 63-14117. In the prior art, a rotary polygon mirror is used to deflect and scan a laser beam. Thus, the polygonal body having considerable mass is rotated at a high speed so that the image recording apparatus of the prior art is highly stable and hardy influenced by the oscillations coming from a recording unit. The rotary polygon mirror is fixed directly and firmly to the optical base of an image pickup system so that the scanning by the laser beam can be stabilized.

In other words, it has been common knowledge in the prior art that the optical deflector is firmly fixed to the optical base. The following structure is disclosed in Japanese Patent Laid-Open No. 63-14117.

FIG. 6 is a top plan view showing the structure of the beam scanning optical system of the above-specified laser recording apparatus.

A laser beam emitted from a semiconductor laser 31 has its shape corrected by a collimator lens 32 and is guided through a cylindrical lens 33 until it is introduced into a deflector 300 by a reflecting mirror 41. The deflector 300 deflects the laser beam in a predetermined direction at a predetermined speed.

The laser beam thus deflected is focused on an image retainer 11 to form an electrostatic latent image by a scanning lens 42 and a cylindrical lens 36.

The cylindrical lenses 33 and 36 are used to correct the tilt, if any, of the reflecting mirror attached to the deflector 300. Reference numeral 38 designates a reflecting mirror for reflecting the laser beam, when this beam is reflected to the uppermost end, as shown, to a sensor 39 to generate a scan starting signal.

Here, one cylindrical lens 36 may be made of plastics. In case a plastic lens is used, its facial shape can be relatively simply matched with the optimum shape so that the performance of the whole optical system can be improved.

In case, however, the tilt of the reflecting mirror is very small, the aforementioned cylindrical lenses 33 and 36 can be omitted.

The scanning lens 42 is used to focus the laser beam correctly on the surface of the image retainer and to scan the image retainer with the laser beam at a constant speed.

In case the reflecting mirror is oscillated at the intrinsic frequency of the deflector 300, its angle of deflection $\theta$ is expressed by the following formula:

$$\theta = A \sin \omega t,$$

where
A: the maximum angle of deflecting of the reflecting mirror;
$\omega$: an angular velocity; and
t: a time.

Therefore, if the spot position of the laser beam is a function $X(\theta)$ of the angle $\theta$, the scanning lens 42 is provided with the following characteristics:

$$X(\theta) = A.f.\arcsin(\theta/A),$$

where f: the focal length of the scanning lens 42.

Then, in case the spot position of the laser beam on the image retainer 11 is expressed as the function $X(t)$ of the time t, this function is expressed in the following form from the above-specified formula:

$$X(t) = A.f.\omega t.$$

As a result, conversion in uniform motion can be accomplished by the use of that scanning lens 42, as described above. An image quality without any distorsion can be obtained in case the electrostatic latent image is to be formed by the uniform motion.

The deflector 300 to be used in such optical scanning system can be exemplified by the deflector 300 using a deflecting member 331, as shown in FIG. 7.

With reference to FIG. 7, the deflector 300 has an elongated frame 315 having a generally rectangular shape. At a central portion of the frame 315, there is disposed a drive coil 311 which is overlain by a reflecting mirror 312. The reflecting mirror 312 and the drive coil 311 are rotatably supported by ligaments 313a and 313b which are interposed between the reflecting mirror 312 and the frame 315 and between the drive coil 311 and the frame 315, respectively.

Thus, the deflecting member 310 is integrally constructed of the drive coil 311, the reflecting mirror 312 and the rotatably supporting ligaments 313a and 313b.

The frame 315 may be made of a material allowing an easy etching and having a large elastic coefficient, such as crystals of rock crystal or quartz, or glass. In case the rock crystal is used, the frame 315 desirably has a thickness of about 0.1 mm to 0.5 mm.

The working means for forming the deflecting member 310 in the frame 315 is usually the photolithography and the etching technique for the fine working. The surface of the deflecting member 310 thus etched is plated with chromium and then silver so as to reduce the electric resistance.

In case, on the other hand, a semiconductor laser is used as a light source, the reflecting mirror 312 is plated with gold, silver or aluminum so as to raise its reflectivity. Moreover, the reflecting mirror 312 can be coated, after plated, with a protecting film such as SiO or $SiO_2$ so as to protect its flaw or oxidization.

The reflecting mirror 312 has the following shape selected. Specifically, the laser beam has an elliptical shape long sideways after it has passed through the collimator lens 32 and the cylindrical lens 33. The reflecting mirror 312 to be used may be elongated in the main scanning direction.

In case, moreover, the reflecting mirror 312 is oscillated at a high speed, an air resistance raises a problem, and the reflecting mirror 312 may be advantageous if it has an elliptical shape long sideways, as shown in FIG. 7.

The larger length of the reflecting mirror 312 is different depending upon the focal length of the scanning lens 42, the diameter of the beam spot to be focused on the image retainer 11, or the scanning width on the image retainer 11 and is desirably 4 to 10 mm according to the experiments.

The drive frequency f for oscillating the deflecting member 310 is desirably set either equal to the intrinsic frequency $f_0$ of the deflecting member 310 or within the range defined by the following formula, so as to suppress the input current to the drive coil 311:

$$F = f_0 \pm f_0/Q$$

where Q: the sharpness of resonance of the resonant characteristics.

By using a deflector using the deflecting member, according to the present invention, it is possible to realize a laser recording apparatus which has far higher reliability and higher image quality than those of the prior art. The advantages of the laser recording apparatus of the present invention are as follows:

At first, the deflector is so small-sized that the laser recording apparatus can be more small-sized than that using the rotary polygon mirror Since no motor is used as a rotating drive source, stable oscillations for the deflections can be realized at all times without any noise even for a high-speed scanning.

Secondly, it is possible to realize a small-sized deflector which can be at a higher scanning speed and with a smaller angle of deflection than that using a mechanical oscillating mirror.

Thirdly, the deflecting member is formed by the etching treatment so that it has a high accuracy but no dispersion in its quality. Since, moreover, the ligaments are made of the material having a high elastic coefficient, it is less fatigued than a metal rod being oscillated by a mechanical oscillating mirror so that stable operations can be expected for a long time.

Thus, the laser recording apparatus according to the present invention can have a very high reliability so that it can provide a highly reliable recording apparatus.

Fourthly, since the deflecting member is molded into one piece, it is possible to establish a large angle of deflection and a high intrinsic number of oscillations. Therefore, the deflecting member is suited for an apparatus which uses a large recording-paper size and aims at a higher recording.

Fifthly, since the reflecting mirror face of the deflector is not so large as the beam spot, the optical scattering on the reflecting face less influences. Since the deflecting member is molded into one piece, the mirror is stably oscillated even if the surrounding temperature and the environmental conditions change. Thus, a regular beam scanning can be accomplished. As a result, a satisfactory final image can always be obtained even for a high-speed recording operation.

The proposed apparatus has the excellent advantages described above but is not resistant to the vibrations and impacts applied from the outside to the beam scanning optical system. Thus, there arises a problem that the quality of the image obtained by the scanning is dropped by the influences of the oscillations and the impacts.

SUMMARY OF THE INVENTION

An object of the present invention is to provide an image recording apparatus which is enabled to form a satisfactory image stably by shielding the oscillations generated at an image forming portion.

This object can be achieved by an image recording apparatus which includes a beam scanning optical system using a deflector having a deflecting member having a frame, a reflecting mirror, a drive coil and ligaments molded into one piece, wherein the improvement comprises an oscillation damping member made of an elastomer of low hardness and viscous resilience and interposed between at least the optical system including said deflector and an image forming portion.

The other objects and features of the present invention will become apparent together with the descriptions of the drawings.

BRIEF DESCRIPTION OF THE DRAWINGS

FIG. 6 is a top plan view showing the beam scanning optical system;

FIG. 7 is a top plan view showing the deflecting member;

DESCRIPTION OF THE PREFERRED EMBODIMENTS

The present invention will be described in connection with the embodiments thereof with reference to the accompanying drawings.

(Embodiment 1)

Figure 1:
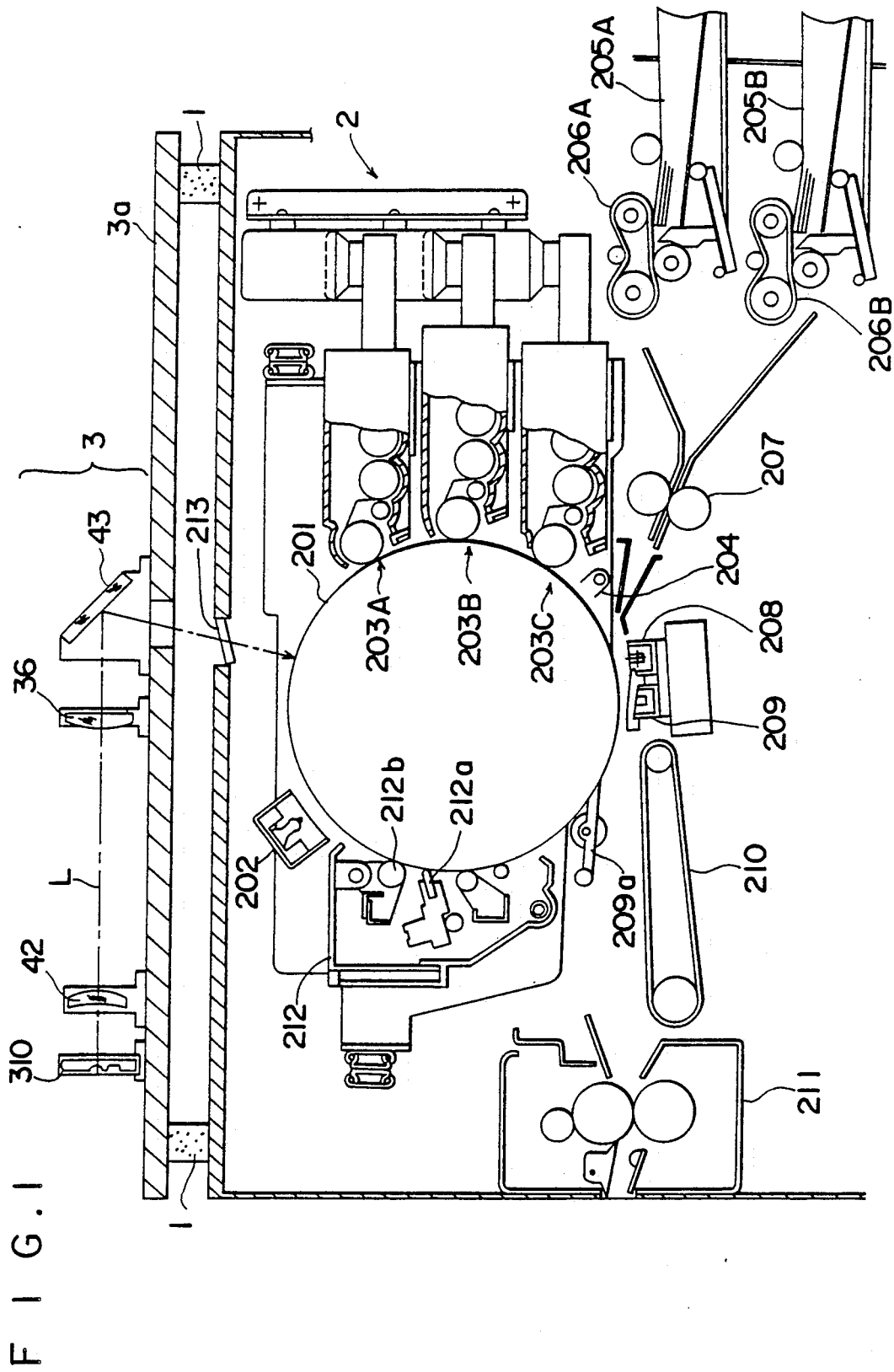
FIG. 1 is a section showing an essential portion of one embodiment of the image recording apparatus according to the present invention.

FIG. 1 is a section showing an essential portion of the first embodiment of the image recording apparatus according to the present invention.

In FIG. 1, reference numeral 3 designates a beam scanning optical system acting as writing means using the aforementioned laser beam and deflector 300. Numeral 3a designates an optical base acting as the base of the beam scanning optical system. Numerals 36 and 42 designate the cylindrical lens and scanning lens which have been described with reference to FIG. 6. Numeral 43 designates a reflecting mirror for reflecting a laser beam L toward a photosensitive member 201. Numeral 213 designates a dust-proof glass plate disposed in the incident window of an image forming portion 2 for the laser beam L. This dust-proof glass plate 213 is positioned at an oblique angle with respect to the laser beam L so as to prevent the return of the reflected light, because the laser oscillations become unstable when the lights reflected on the glass plate 213 are returned to the laser oscillator (i.e., semiconductor laser). Numeral 1 designates an oscillation damping member sandwiched at each of four corners between the optical base 3a and the image forming portion 2. Numeral 201 designates a photosensitive member or a drum-shaped image retainer which is made rotatable of arrow. Numerals 202 designate a charging device for charging the photosensitive member 201 uniformly. Numerals 203A, 203B and 203C designate a plurality of developing devices which are charged with red and blue color toners and black toner for effecting multi-color recording operations. Numeral 204 designates a pre-transfer exposing device for exposing the photosensitive member 201 to eliminate the electricity therefrom before the transfer. All of the members recited above are arranged along the circumferential edge of the photosensitive member 201.

On the other hand, there is provided a paper feed cassette assembly which is equipped with paper feed cassette 205A and 205B for different kinds and sizes of sheets of transfer paper. Numerals 206A and 206B designate separate paper feed means for letting off their respective transfer papers P separately one by one from the paper feed cassettes 205A and 205B. Numeral 207 designates second paper feed rollers for feeding the transfer paper P let off toward the drum of the photosensitive member 201 in synchronism with the toner image on the photosensitive member 201. Numeral 208 designates a transfer device acting as the transfer portion. Numeral 209 designates a separator for separating the transfer paper P carrying the toner image from the drum of the photosensitive member 201. Numeral 209a designates a separating pawl. Numeral 210 designates carrier means for carrying the transfer paper P separated to a fixing device 211. Numeral 212 designates a cleaning device which is equipped with a cleaning blade 212a and a cleaning roller 212b.

Next, the operations of the one embodiment of the present invention shown in FIG. 1 will be described.

First of all, the photosensitive member 201 of the image recording apparatus starts rotating in the arrow direction so that its surface is uniformly charged by the charging device 202. Then, the photosensitive member 201 is exposed to an image by the beam scanning optical system 3 to form a first (red) electrostatic latent image. This latent image is reversely developed by the developing device 203A, which is charged with the red toner, to form a red toner image. In the meanwhile, the developing devices 203B and 203C, the pre-transfer exposing device 204, the second paper feed rollers 207, the transfer device 208 and the separator 209 are left inoperative, and the separating pawl 209a and the cleaning blade 212a and cleaning roller 212b of the cleaning device 212 are retracted so that they may not damage the toner image formed on the photosensitive member 201. After this, the photosensitive member 201 is charged and exposed (in blue) like before, and the reverse development is accomplished by the developing device 203B to superpose a blue toner image on the aforementioned red toner image. Then, the charging operation, the third exposure (in black) and the reverse development by the developing device 203C are accomplished again to superpose a black toner image. The photosensitive member 201 carrying those toner images are exposed to have their electricity eliminated by the pre-transfer exposing device 204. In the meanwhile, the transfer papers P of the kind or size selected by the not-shown control panel are let off one by one from either the paper feed cassette 205A or 205B by the first paper feed roller 206A or 206B and fed to the transfer portion by the second paper feed roller 207 in synchronism with the rotations of the photosensitive member 201 so that the three-colored toner image is transferred to the transfer paper P by the transfer device 208. The transfer paper P thus carrying the toner image transferred thereto is separated from the photosensitive member 201 by the separating device 209 and its separating pawl 209a and is carried to and fixed by the fixing device 211 by the carrier means 210 until it is discharged to the outside. On the other hand, the photosensitive member 201 thus stripped of the transfer paper P continues rotating and has its surface cleaned by the cleaning device 212 for the subsequent image formation.

The description thus far made is directed to the image recording apparatus which is constructed of the three- or multi-color image forming portion and the beam scanning optical system. No matter whether the image forming portion might be for monochromatic or multi-color operations, it is necessary to prevent the oscillations generated in the image forming portion 2 from being transmitted to the beam scanning optical system 3. To this end, the oscillation damping member 1 can be exemplified by a variety of materials and shapes. Since, however, a very high oscillation damping performance is required, the natural or butyl rubber used in the prior art cannot be used as the oscillation damping member of the image recording apparatus because it has a large impact resilience and a small loss coefficient and has a low oscillation damping performance.

In recent years, an elastomer such as polyurethane or silicone gel having a viscous resilience and a low hardness is developed as the impact absorbing or oscillation damping material and is found to be suitable for the above-specified purpose.

The following formulas are generally known as the intrinsic frequency fn (Hz) and the transmissibility of oscillation i of the system using the oscillation damping material:

$$fn = \tfrac{1}{2}\pi \sqrt{k\,dyn \times g/W}\ ,$$

where
  k dyn: Dynamic spring constant (Kg f/cm);
  g: Acceleration of gravity (cm/sec$^2$); and
  W: Shared load (Kg) for one oscillation damping member;
  and $$i = (1/\lambda^2 - 1) \times 100\%,$$

where
  $\lambda$: f/fn (i.e., frequency ratio); and
  f: Oscillation frequency (Hz).

It is said that the oscillation damping effect can be achieved for the value of $\lambda$ equal to or larger than $\sqrt{2}$.

The following results are obtained by experimentally measuring the intrinsic frequency and the transmissibility of oscillation for a variety of oscillation damping materials 1 of the image recording apparatus shown in FIG. 1 and the image quality when the oscillation damping members are mounted.

First of all, the oscillations generated during the operation of the image forming portion 2 are examined to reveal that the oscillations at the center frequency of 100 Hz have a large amplitude and that the oscillations at the frequency lower than 100 Hz are few. Therefore, the oscillation frequency for the experiments is set at 100 Hz, and the acceleration of the maximum amplitude of these oscillations is set at 0.2 G.

Figure 2:
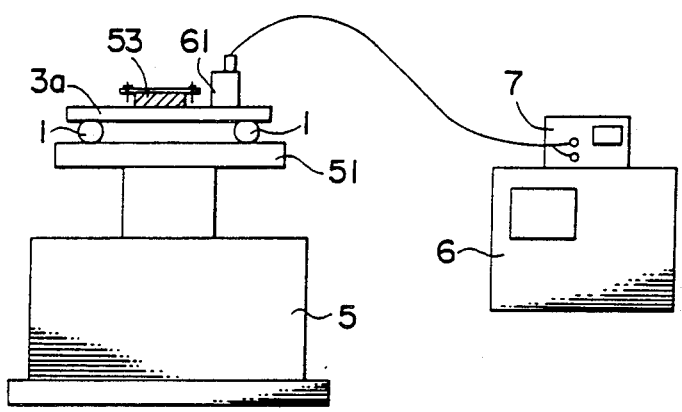
FIG. 2 is a diagram showing the structure of an experimental apparatus used to measure and experiment the oscillations of an oscillation damping member.

The experimental apparatus was constructed, as shown in FIG. 2, by mounting the oscillation damping members 1 on an oscillating base 51 of an oscillating apparatus 5 at its four corners as in the actual image recording apparatus, by mounting the optical base 3a on the damping members 1 together with a dummy load 53 giving the same weight as that of the beam scanning optical system 3, by attaching an oscillation sensor and its mounting portion 61 to be optical base 3a, and by connecting the oscillation sensor with an oscillation analyzer 6 and an acceleration meter 7. The oscillations to be transmitted to the optical base 3a were measured when attaching the experimental apparatus described above to the oscillation damping members 1, as specified in Table 1, and by applying the oscillations of 100 Hz and 0.2 G by the oscillating apparatus 5:

TABLE 1

| Oscillation damping members | Shape | Materials | Static Spring Constant |
|---|---|---|---|
| a | A | butyl rubber 15° | 42.5 Kgf/cm |
| b | A | butyl rubber 20° | 46.5 |
| c | A | butyl rubber 27° | 79.0 |
| d | B | α-Gel | 8.5 |
| e | C | neoprene 10 | 12.0 |
| f | D | butyl rubber 30 | 14.2 |
| g | E | Solbosein 30° | 10.0 |
| h | F | Solbosein 30° | 5.3 |
| i | F | Solbosein 40° | 5.5 |

Figure 3A:
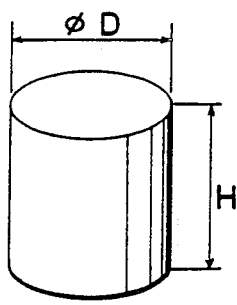
FIGS. 3A to 3C are diagrams showing the shapes of the oscillation damping member.
Figure 3B:
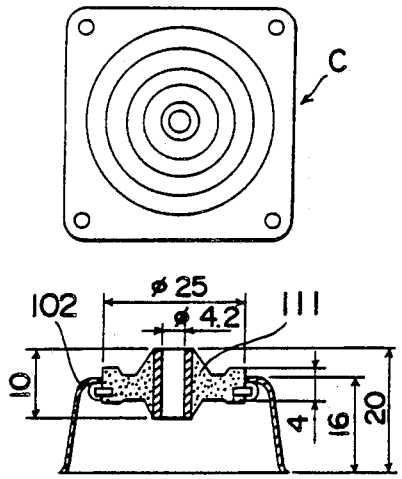
Figure 3C:
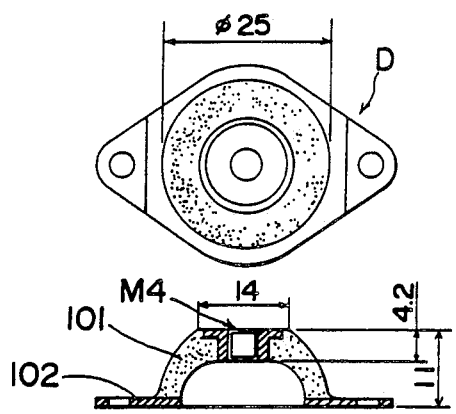

In Table 1, α-Gel is an oscillation damping material made of a silicone gel produced by Cubic Engineering and having the rate of penetration of 50 to 200 (according to JIS K2530-1976); Solbosein is the commercial name of the oscillation damping material of polyurethane produced by B.T.R. of England; and "shape" means the shapes and sizes of the individual oscillation damping materials, as tabulated in FIGS. 3A to 3C.

The results, as enumerated in Table 2, were obtained by the oscillation experiments and the running tests using the above-specified oscillation damping materials:

TABLE 2

| Oscillation damping members | fn (Hz) | $\lambda = f/fn$ (Hz) | Transmissibility Theory (%) | Transmissibility Exp. (%) | Image (Exp.) |
|---|---|---|---|---|---|
| a | 34.1 | 2.93 | 13.2 | 57.5 | X |
| b | 35.7 | 2.80 | 14.6 | 41.6 | X |
| c | 46.5 | 2.15 | 27.6 | 83.1 | X |
| d | 15.3 | 6.55 | 2.8 | 7.9 | |
| e | 18.1 | 5.51 | 3.4 | 21.3 | X |
| f | 19.7 | 5.07 | 4.1 | 22.6 | X |
| g | 16.6 | 6.04 | 2.8 | 26.1 | |
| h | 12.1 | 8.30 | 1.5 | 15.5 | |
| i | 12.3 | 8.14 | 1.5 | 12.9 | |

In Table 2: the value fn is the resonant frequency (of intrinsic frequency) of the beam scanning optical system 3 having the individual oscillation damping materials attached thereto; and the transmissibility is the transmissibility of oscillation of which (Theory) denotes the theoretical value i and the (Exp.) denotes the actually measured value.

The image (Exp.) enumerates the visually judged results of the stability of the image obtained in case the oscillation damping members were actually attached to the image recording apparatus, and the symbols "X", " " and " " designate "No Good", "Good" and "Excellent", respectively.

In this case, the total load of the beam scanning optical system was 4.53 Kg, and the load of one oscillation damping material was W=1.09 Kg.

Figure 4:
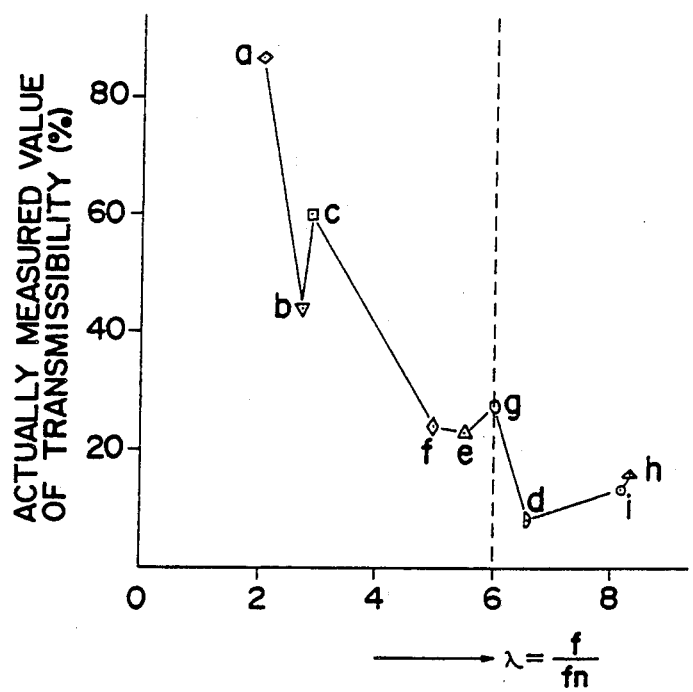
FIG. 4 is a graph plotting the relation between the frequency ratio λ of the optical base and the measured values of the oscillation transmission percentages when the individual oscillation damping members are used.

For the calculated (theoretical) values and the measured values, the relation between the λ and the measured oscillation transmissibility, when the individual oscillation damping materials were used, is examined to reveal that the oscillation transmissibility was the lower for the larger λ, as presented in FIG. 4.

Figure 5:
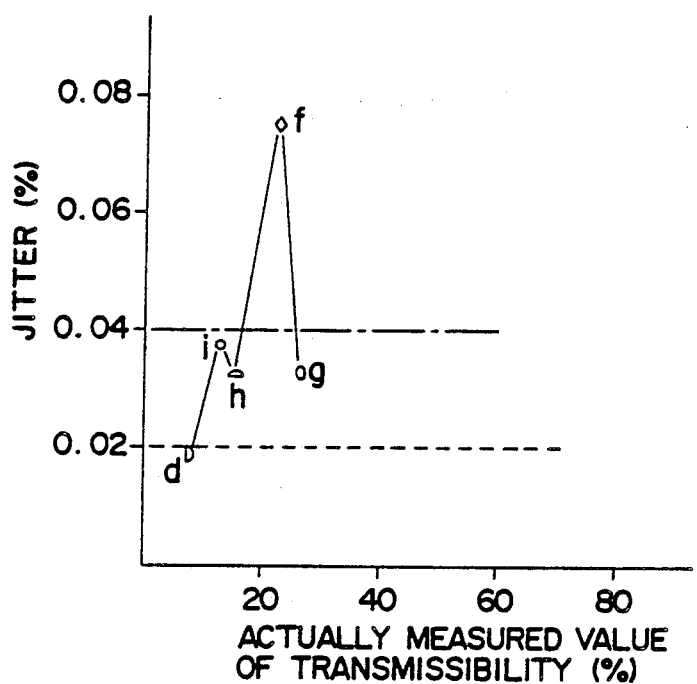
FIG. 5 is a graph plotting the relation between the measured value of the oscillation transmission percentages of the oscillation damping members and the jitter generated in the optical base.

Moreover, the relation between the jitter (i.e., the coefficient of fluctuation of the scanned two points during the scanning period) caused in the optical base 3a during the oscillations and the measured oscillation transmissibility is examined to reveal that the jitter was the lower for the smaller measured oscillation transmissibility, as presented in FIG. 5, but that the jitter scattered, as indicated by the oscillation damping material f.

The influences of the jitter upon the image is such that the image is considerably stable for the jitter equal to or less than 0.04% and excellently stable for the jitter equal to or less than 0.02%.

The comparison between FIGS. 4 and 5 has revealed that the jitter drops to 0.04% or less if λ=f/fn is 6 or more.

From Table 2, on the other hand, the theoretical value i of the oscillation transmissibility is 2.8% or less, if the value λ is 6 or more, so that the results of the running test were good to form the stable images.

Thus, an oscillation damping material having the oscillation damping effect can be selected by examining the spring constant of the oscillation damping material 1 to calculate the value λ and the theoretical value i of the oscillation transmissibility.

From the above-specified experiments, it has also been found that the oscillation damping effect is high if either the Solbosein, i.e., the viscous resilient elastomer of polyurethane or the gel substance of α-Gel based on a silicone resin is used.

(Embodiment 2)

Figure 8:
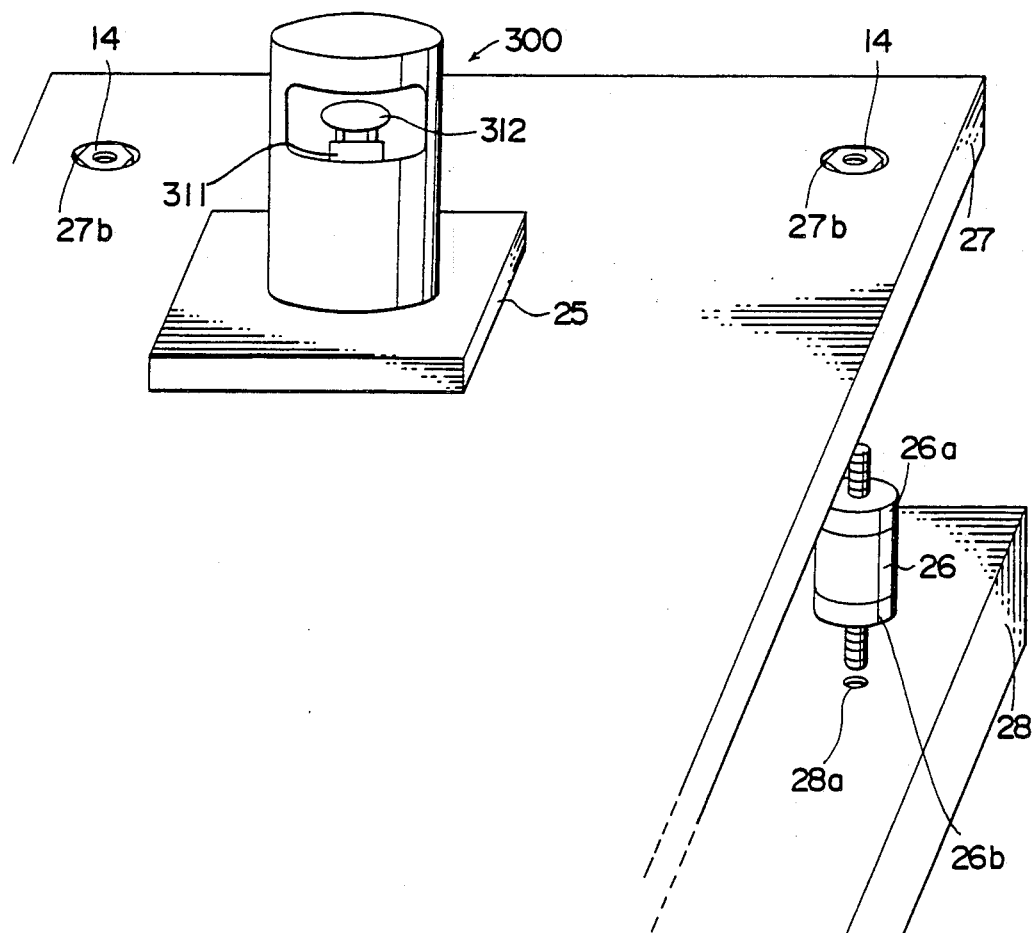
FIG. 8 is a perspective view showing a second embodiment of the mounting structure of the optical base according to the present invention.

FIG. 8 is a perspective view showing a second embodiment of the optical base mounting structure according to the present invention.

In FIG. 8, a fixing member 25 is adhered (or screwed) to the bottom of the optical beam deflector 300, and the fixing member 25 in turn is adhered (or screwed) to an optical base 27. The optical base 27 is connected to oscillation damping members 26 and a fixing member 28, as will be described in the following discussion. The fixing member 28 is fixed directly to a casing.

The oscillation damping member 26 damps the oscillations of the optical beam deflector 300 by attenuating the disturbance oscillations transmitted through the fixing member 28 and is interposed between the fixing member fixed on the casing and the optical beam deflector 300 to adjust the height of the mirror 312 in the optical beam deflector 300 and the horizontal position of the optical base 27.

The oscillation damping member 26 described above is constructed, as shown in FIG. 9.

Figure 9:
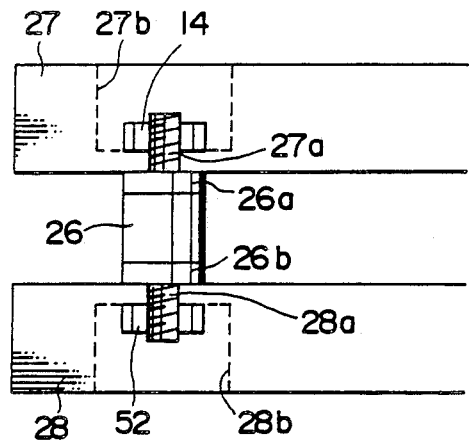
FIG. 9 is a side elevation for explaining an oscillation damping member, an optical base and a fixing member shown in FIG. 8.

As shown in FIG. 9, the optical base 27 and the fixing member 28 are formed with recesses 27b and 28b, respectively, the bottoms of which are internally threaded at 27a and 28a, respectively (as seen from FIG. 8). These threaded portions 27a and 28a are positioned to face each other (as seen from FIG. 9), and the oscillation damping member 26 is interposed between the threaded portions 27a and 28a. To the top and bottom of the oscillation damping member 26, there are adhered metal caps 26a and 26b, the respective upper and lower portions of which are provided with threaded projections. These threaded upper and lower projections of the metal caps 26a and 26b are screwed into the threaded portions 27a and 28a, respectively.

If the upper screw of the metal cap 26a is clockwise, the lower screw of the metal cap 26b is counter-clockwise. If, on the contrary, the upper screw of the metal cap 26a is counter-clockwise, the lower screw of the metal cap 26b is clockwise.

By turning the oscillation damping member 26 to the right or left of FIG. 9, therefore, the gap between the optical base 27 and the fixing member 28 can be adjusted to adjust the height and the horizontal position of the optical base 27 with respect to the fixing member 28. By adjusting the position of the optical base 27, moreover, the height and horizontal position of the mirror 312 in the optical beam deflector 300 placed on the optical base 27 can be adjusted to adjust the fluctuations of the height of the oscillation damping member 26 due to the distortion.

After these adjustments of the height and horizontal position, the upper screw of the metal cap 26a is fastened by means of a nut 14, and the lower screw of the metal cap 26b is fastened by means of a nut 52. By means of the double nuts at the corresponding bolts, the oscillation damping member 26 can be firmly attached while preventing the optical base 27 and the fixing member 28 from being loosened.

The oscillation damping member 26 to be used is made of a shock absorbing elastomer of urethane (i.e., viscous resilient polyurethane elastomer) and is exemplified, to provide satisfactory oscillation damping characteristics, by either "Solbosein" (produced by Sanshin Kosan K.K. or B.T.R. of England) or a gel substance of silicone having the rate of penetration of 50 to 200 (according to JIS K2530-1976 under the load of 50 g) such as α-GEL (produced by Cubic Engineering). By thus fixing the optical beam deflector 300 on the optical base 27 through the oscillation damping member 26 of the shock absorbing elastomer of urethane, the disturbance oscillations to be transmitted from the fixing member 28 to the optical beam deflector 300 can be effectively attenuated.

Moreover, the top bolt of the metal cap 26a and the bottom bolt of the metal cap 26b are screwed into the internally threaded portions 27a and 28a at the step of assembling the copying machine. This assembling works can be progressed remarkably easily because they are accomplished by screwing the bolts into the threaded portions and by subsequently turning the oscillation damping member 26 to adjust the height and horizontal position of the optical base 27 with respect to the fixing member 28.

According to the mounting structure of the optical base of the present invention, the oscilllation damping member 26 made of a shock absorbing elastomer of urethane can attenuate the oscillations, which might otherwise be transmitted through the fixing member 28 to the deflecting member 310 from the motor such as the stepping motor or the motor of the photosensitive drum, so that it can prevent the write position of the photosensitive drum from being offset and the beam diameter from fluctuating to cause the blur.

Although the present invention has been described in connection with its second embodiment, a variety of modifications can be made according to the technical concept of the present invention. In the second embodiment, for example, the metal caps 26a and 26b are adhered and have top and bottom bolts. Despite of this structure, however, the bolts can be projected directly from the oscillation damping member 26 by embedding them in the oscillation damping member 26.

(Embodiment 3)

Figure 10:
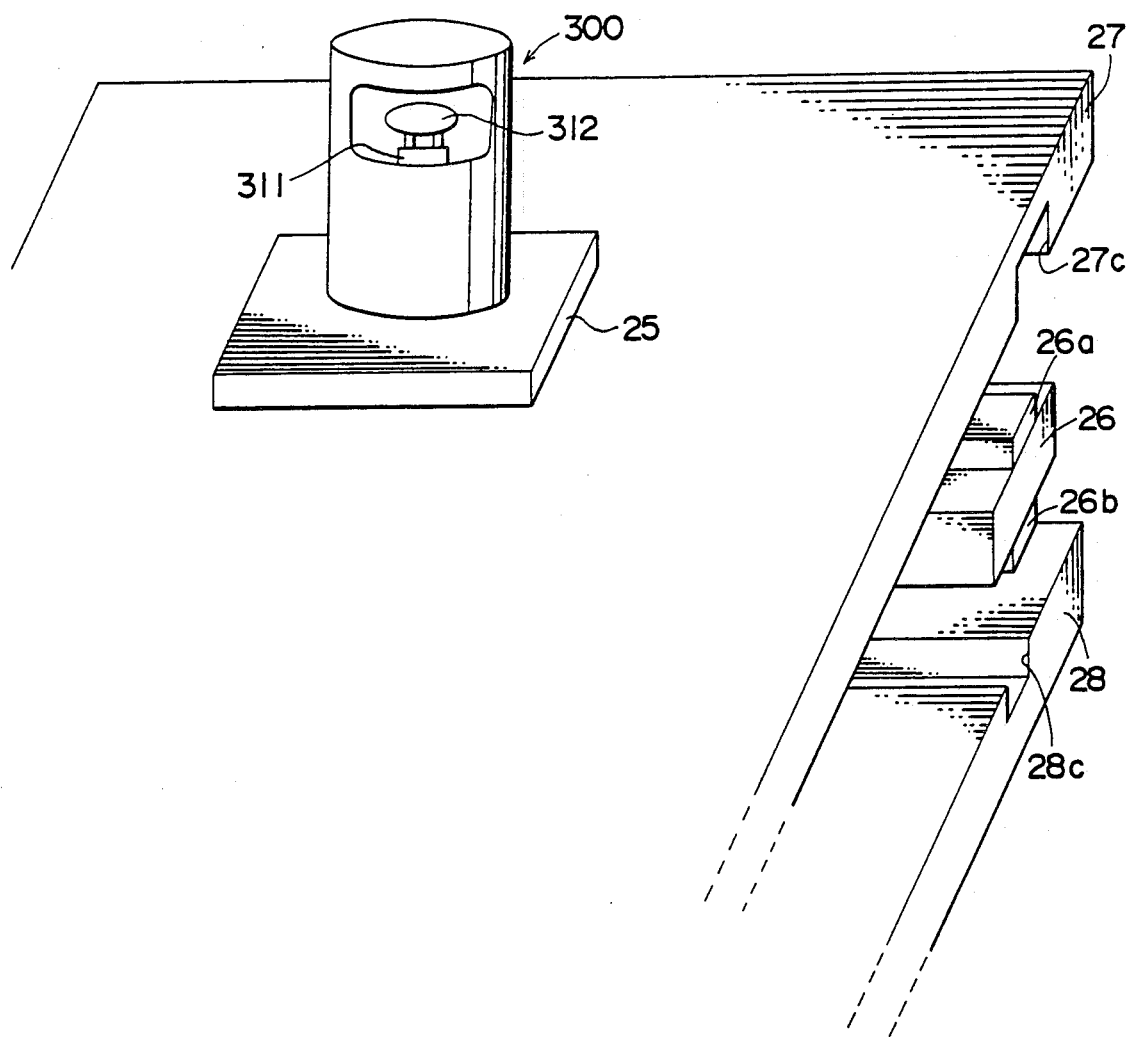
FIG. 10 is a perspective view showing a third embodiment of the mounting structure of the optical base according to the present invention.
Figure 11A:
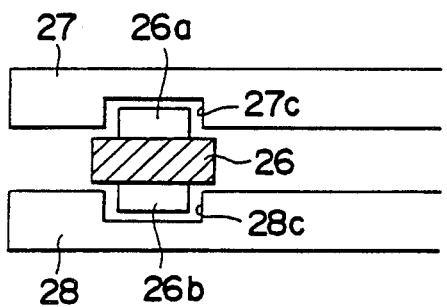
FIGS. 11A and 11B are diagrams for explaining the respective oscillation damping members of the mounting structure.

In FIGS. 10 and 11A, the optical base 27 and the fixing member 28 are formed with a groove 27c and 28c, respectively. These grooves 27c and 28c are positioned to face each other and to interpose the oscillation damping member 26 inbetween. To the top and bottom of this oscillation damping member 26, respectively, there are adhered a metal cap 26a and a metal cap 26b, which are fitted in the grooves 27c and 28c, respectively, to fix the optical base 27 and the fixing member 28 in position.

Figure 11B:
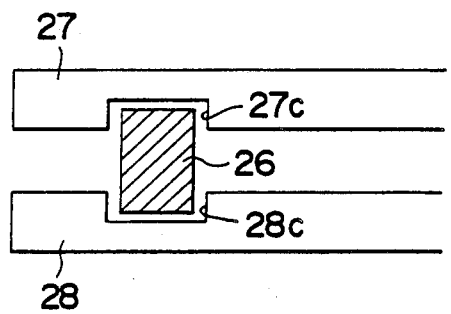

FIG. 11B shows another shape of the oscillation damping member 26, from which are omitted the metal caps 26a and 26b shown in FIG. 11A. In this embodiment shown in FIG. 11B, the oscillation damping member 26 per se is fitted in the grooves 27c and 28c to fix the optical base 27 and the fixing member 28 in position.

Moreover, the fitting operations of the metal caps 26a and 26b in the grooves 27c and 28c or the oscillation damping member 26 in the grooves 27c and 28c are accomplished at the step of assembling the copying machine. These assembling works are accomplished just by fitting the caps or cap in the grooves (or recesses) so that they can be advanced remarkably easily.

Although the third embodiment of the present invention has been described above, a variety of modifications can be conceived according to the technical concept of the present invention. Specifically, the embodiment is directed to the case in which the optical base 27 and the fixing member 28 are formed with the grooves 27c and 28c, which could be formed into circular or rectangular recesses.

On the other hand, the oscillation damping member 26 is formed to have a rectangular section, but its metal caps 26a and 26b shown in FIG. 11A could be molded of an elastic material into one piece with the oscillation damping member 26.

(Embodiment 4)

Figure 12:
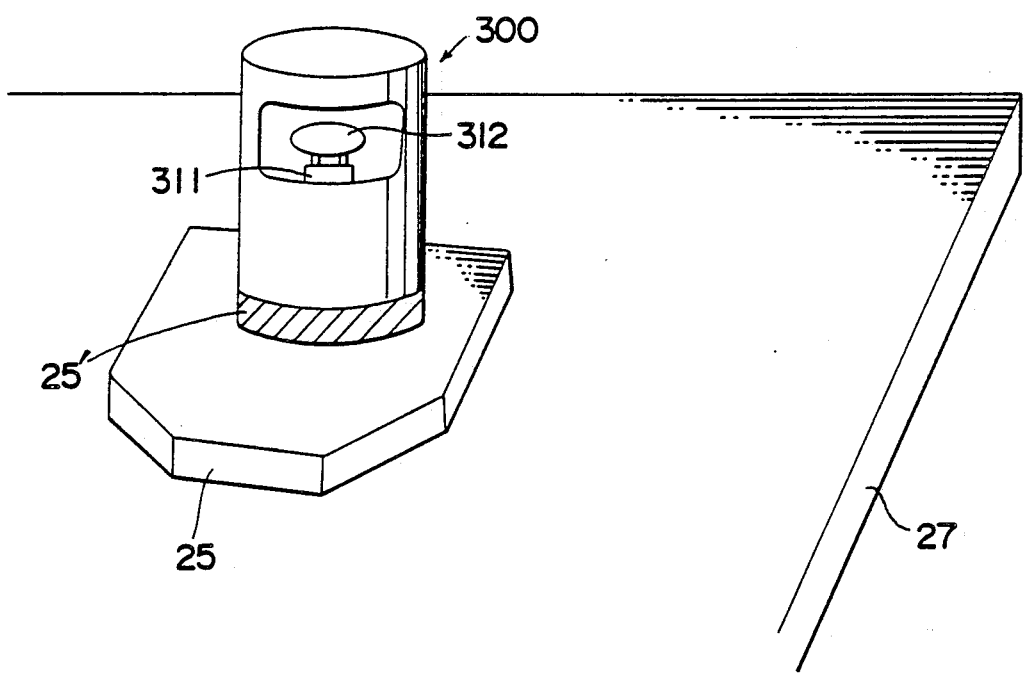
FIG. 12 is a perspective view showing the mounting structure of the optical base according to a fourth embodiment of the present invention.

FIG. 12 is a perspective view showing a fourth embodiment of the mounting structure of the optical beam deflector according to the present invention.

As shown in FIG. 12, there is adhered or fixed to the bottom of the optical beam deflector 300 an oscillation damping member 25′, which is further adhered or fixed to the fixing member 25. This fixing member 25 is made of a metal plate. The setting conditions of the oscillation damping member 25′ are determined according to the relations among the weight of the optical beam deflector 300, the acceleration of the oscillation source including the fixing member 25, and the modulus of elasticity of the oscillation damping member 25′. The fixing member 25 is fixed to the optical base 27 directly or through a spring or an oscillation damping member. The oscillation damping member 25' could be identical to the oscillation damping member 26.

(Embodiment 5)

In the fifth embodiment, the ligaments 313a and 313b are so formed, when the mirror deflecting member 310 is to be manufactured, that the former 313a is narrower than the latter 313b. This is because the reflecting mirror 312 and the drive coil 311 have their weights and rotation moments substantially borne by the ligament 313b whereas the ligament 313a merely bears the reflecting mirror 312 and the drive coil 311 against the oscillations transmitted to the mirror deflecting member 310 from the outside.

Although the fifth embodiment of the present invention has been described, a variety of modifications can be made according to the technical concept of the present invention. In this embodiment, for example, the ligament 313a located above the reflecting mirror 312 is narrower than the ligament 313b, but the ligament 313b located below the drive coil 311 could be narrower than the ligament 313a. In this modification, the reflecting mirror 312 and the drive coil 311 have their weights and rotation moments substantially borne by the ligament 313a, whereas the ligament 313b plays a mere role to bear the reflecting mirror 312 and the drive coil 311 against the oscillations transmitted to the mirror deflecting mirror 310 from the outside.

As has been described hereinbefore, according to the present invention, there is provided an image recording apparatus which is enabled to form a satisfactory image stably by arranging an oscillation damping member of viscous resilient elastomer of low hardness between a beam scanning optical system and an image forming portion to shield the oscillations generated at the image forming portion.

An image recording apparatus of the present invention comprises: an optical beam deflector having a built-in mirror deflecting member for turning and oscillating a mirror reciprocally to deflect an optical beam; an optical base carrying said optical beam deflector; a support member for supporting said optical base; an oscillation damping member arranged between a first threaded portion formed in said optical base and a second threaded portion formed in said support member; third and fourth threaded portions formed in the top and bottom of said oscillation damping member; and first and second bolts screwed into said third and fourth threaded portions, wherein said optical base is fixed by screwing said first bolt after said first and third threaded portions have been screwed and by screwing said second bolt after said second threaded portion and said fourth threaded portions have been screwed, whereby the disturbance oscillations can be prevented from being transmitted to said mirror deflecting member to dislocate the writing position of a photosensitive member or to fluctuate the beam diameter thereby to cause blurs.

Since it is thus possible to prevent the writing position of the photosensitive member from being dislocated and the beam diameter from being fluctuated, it is possible to prevent the image quality from being degraded due to the drop in the resolution or contrast.

Moreover, the third threaded portion is fastened by the first bolt, and the fourth threaded portion is fastened by the second bolt. Since the double nuts are thus used at the individual threaded portions after the positional and horizontal adjustments, the optical base and the support member can be firmly attached by means of the oscillation damping members while being prevented from becoming loose.

Another image recording apparatus according to the present invention comprises: an optical beam deflector having a built-in mirror deflecting member for turning and oscillating a mirror to deflect an optical beam; an optical base carrying said optical beam deflector; a fixing member for fixing said optical base; and an oscillation damping member interposed between a first recess formed in said optical base and a second recess formed in said fixing member, wherein the oscillations of said mirror oscillating member are damped by said oscillation damping member, and wherein the position of said optical base is regulated by arranging said oscillation damping member between said first recess and said second recess, whereby effects similar to those of the foregoing embodiments can be attained.

Moreover, the oscillation damping member is fitted between the first and second recesses merely by engagement with these recesses so that the position of the optical base can be regulated by the remarkably easy assembling operations.

Still another image recording apparatus according to the present invention comprises: an optical beam deflector having a built-in mirror oscillating member for turning and oscillating a mirror to deflect an optical beam; an oscillation damping member adhered to the outer face of said optical beam deflector; and a fixing member adhered to said oscillation damping member, wherein said optical beam deflector is fixed by said fixing member, whereby effects similar to those of the foregoing embodiment can be attained.

Still another image recording apparatus according to the present invention comprises: a reflecting mirror for deflecting an optical beam; a drive coil for turning and oscillating said reflecting mirror; a first ligament for supporting the rotations and oscillations of said reflecting mirror; and a second ligament for supporting the rotations and oscillations of said drive coil, wherein said first and second ligaments are made to have different widths, whereby the oscillation damping properties can be improved even if the base used is made of a sufficiently thin plate of rock crystal.

What is claimed is:

1. In an image recording apparatus comprising an image forming portion including an image retainer, and a beam scanning optical system including a deflector having a deflecting member with a frame, a reflecting mirror, a drive coil and ligaments molded into one piece, the improvement wherein a resilient member is interposed between said optical system and said image forming portion, said resilient member having the characteristic of $$i < 2.8\% \text{ and } i = \{1/(f/fn)^2 - 1\} \times 100\%$$

wherein i is the theoretical value of oscillation transmissibility of said resilient member, fn is the intrinsic frequency (Hz) of said optical system including said resilient member, and f is the oscillation frequency (Hz) of said image forming portion.

2. The image recording apparatus according to claim 1, wherein said resilient member is made of a viscous resilient elastomer of low hardness.

3. The image recording apparatus according to claim 1, wherein said resilient member is made of a viscous resilient polyurethane elastomer.

4. The image recording apparatus according to claim 1, wherein said resilient member has at both ends thereof bolts, and said resilient member being connected to said optical system and said image forming portion by said bolts, respectively.

* * * * *